(12) United States Patent
Turchetta et al.

(10) Patent No.: US 8,123,358 B2
(45) Date of Patent: Feb. 28, 2012

(54) MOTION PICTURE WATERMARKING TECHNIQUE

(75) Inventors: Daniele Turchetta, Rome (IT);
Giuseppe Piccardi, Rome (IT);
Massimo Masini, Rome (IT)

(73) Assignee: Thomson Licensing,
Boulogne-Billancourt (FR)

( * ) Notice: Subject to any disclaimer, the term of this patent is extended or adjusted under 35 U.S.C. 154(b) by 1129 days.

(21) Appl. No.: 11/795,858

(22) PCT Filed: Jan. 23, 2006

(86) PCT No.: PCT/EP2006/050361
§ 371 (c)(1),
(2), (4) Date: Jul. 23, 2007

(87) PCT Pub. No.: WO2006/079613
PCT Pub. Date: Aug. 3, 2006

(65) Prior Publication Data
US 2008/0097761 A1   Apr. 24, 2008

(30) Foreign Application Priority Data
Jan. 25, 2005 (IT) .............................. MI2005A0100

(51) Int. Cl.
*G10L 11/00* (2006.01)
(52) U.S. Cl. .......................................... 352/236; 353/19
(58) Field of Classification Search ............... 352/5, 44, 352/236, 244, 6; 705/911; 380/201; 353/19
See application file for complete search history.

(56) References Cited

U.S. PATENT DOCUMENTS
5,080,479 A * 1/1992 Rosenberg .................. 352/92
(Continued)

FOREIGN PATENT DOCUMENTS
EP          1137250          9/2001
(Continued)

OTHER PUBLICATIONS

Arnold et al., "Techniques and Applications of Digital Watermarking and Content Protection", Artech House Publishers, Jul. 2003, pp. 1064-1087. Reference gives you full range of media, images, audio data, video, 3-D geometry data, formatted text, that you can protect with digit.

(Continued)

*Primary Examiner* — William C Dowling
(74) *Attorney, Agent, or Firm* — Robert D. Shedd; Robert B. Levy

(57) ABSTRACT

Watermarking of a motion picture release print occurs by providing on at least one soundtrack at least one tone of a particular frequency on at least one location unique to the release print. Typically, placement of the particular frequency tone occurs on location(s) where the tone will have minimal impact on the existing soundtrack audio. A record of location (s) at which the particular frequency tone appears on the release print is maintained to facilitate comparison with the tones detected in audio visual work to determine whether the audio of an illegal media was recorded from that release print.

7 Claims, 3 Drawing Sheets

U.S. PATENT DOCUMENTS

| | | | |
|---|---|---|---|
| 5,295,131 | A | 3/1994 | Ishibashi et al. |
| 5,473,631 | A | 12/1995 | Moses |
| 5,696,757 | A | 12/1997 | Ozaki et al. |
| 5,754,649 | A | 5/1998 | Ryan et al. |
| 5,787,334 | A * | 7/1998 | Fardeau et al. ............... 725/22 |
| 5,812,501 | A | 9/1998 | Moribe et al. |
| 6,335,912 | B1 | 1/2002 | Kobayashi et al. |
| 6,768,709 | B2 | 7/2004 | Carson et al. |
| 7,113,614 | B2 * | 9/2006 | Rhoads ..................... 382/100 |
| 7,187,633 | B2 | 3/2007 | Lehmann |
| 7,394,519 | B1 * | 7/2008 | Mossman et al. ............ 352/27 |
| 2001/0044899 | A1 | 11/2001 | Levy |
| 2002/0090114 | A1 | 7/2002 | Rhoads et al. |
| 2003/0103645 | A1 | 6/2003 | Levy et al. |

FOREIGN PATENT DOCUMENTS

| | | |
|---|---|---|
| GB | 2365295 | 2/2002 |
| JP | 4-103029 | 4/1992 |
| JP | 9-17030 | 1/1997 |
| JP | 2001-52338 | 2/2001 |
| RU | 2208301 | 2/1999 |
| RU | 2251821 | 5/2005 |
| WO | WO9960791 | 11/1999 |
| WO | WO 00/00348 | 1/2000 |
| WO | WO0111890 | 2/2001 |
| WO | WO 02/11406 | 2/2002 |
| WO | WO 03/039157 | 5/2003 |

OTHER PUBLICATIONS

M.D. Swanson et al: "Multimedia data-embedding and watermarking technologies" Proceedings of the IEEE USSA, vol. 86, No. 6, Jun. 1998, pp. 1064-1087.

Jongweon Kim et al.: "Unique ID Hiding Technique for Internet Broadcast Service of Digital Audio", Sangmyung University, Seoul, Korea, Proceedings of the 6th Lasted Int'l Conference, Signal and Image Processing, Aug. 23-25, 2004, Honolulu, Hawaii, USA, pp. 1-6.

Joe Kilian et al: "Resistance of Digital Watermarks to Collusive Attacks", 1998 IEEE, pp. 271.

Search Report Dated Mar. 1, 2006.

* cited by examiner

MOTION PICTURE WATERMARKING TECHNIQUE

This application claims the benefit, under 35 U.S.C. §365 of International Application PCT/EP2006/050361, filed Jan. 23, 2006, which was published in accordance with PCT Article 21(2) on Aug. 3, 2006 in English and which claims the benefit of Italian patent application No. MI2005A000100, filed Jan. 25, 2005.

TECHNICAL FIELD

This invention relates to a technique for watermarking a motion picture release print and for detecting the presence of that watermark on a copy of the print.

BACKGROUND ART

Piracy of motion picture films constitutes a major loss of revenue for the motion picture industry. The advent of low cost recording technology, in the form of VHS and DV videotape recorders, and Digital Versatile Disk (DVD) recorders has dramatically reduced the investment required to illegally record movies. Moreover, the relative small size of such devices facilitates their transport into a screening facility to make unauthorized copies of copyrighted content.

Most screening facility operators make efforts to stop those who would copy motion picture films if for no reason than to avoid allegations by the content providers of complicity with such illegal activity. However, not all screening operators exercise vigilance, and through indifference, some operators allow pirates to make illegal copies of motion picture films. In rare instances, operators of a screening facility have actively cooperated in such illegal copying. Tracking the perpetrators of such illegal activity has proven difficult since movie studios typically supply hundreds if not thousands of release prints of a major motion picture to movie theaters across the world. Since each release print appears identical to every other, knowing which print served as the master of an illegal copy has traditionally proven quite difficult.

Providing a unique watermark on each release print would greatly facilitate the tracking of illegal copies. However, the nature of the watermark must not appear so prominent on the release print as to alert a potential pirate of its existence. Conversely, detection of the watermark should not prove so onerous as to make adoption impractical. Lastly, the presence of the watermark should not alter viewing of release print by theater patrons.

SUMMARY OF THE INVENTION

Briefly, in accordance with a first illustrative embodiment of the present principles, there is provided a method for watermarking a motion picture release print having at least a one audio track. The method commences by placing on the audio track at one or more known locations a tone of a particular frequency. The location(s) of the particular frequency tone on each release print are unique. Each release print will receive a serial number associated with which are the specific location (s) on the release print that contain the particular frequency tone.

A copy of the motion picture release print watermarked in the manner described above will generate the particular frequency tone at the same location(s) as on the release print. Thus, by detecting presence and location(s) of the particular frequency tone on the copy, a determination can be made whether the copy was derived from a release print, and if so which print.

DETAILED DESCRIPTION

Figure 1:
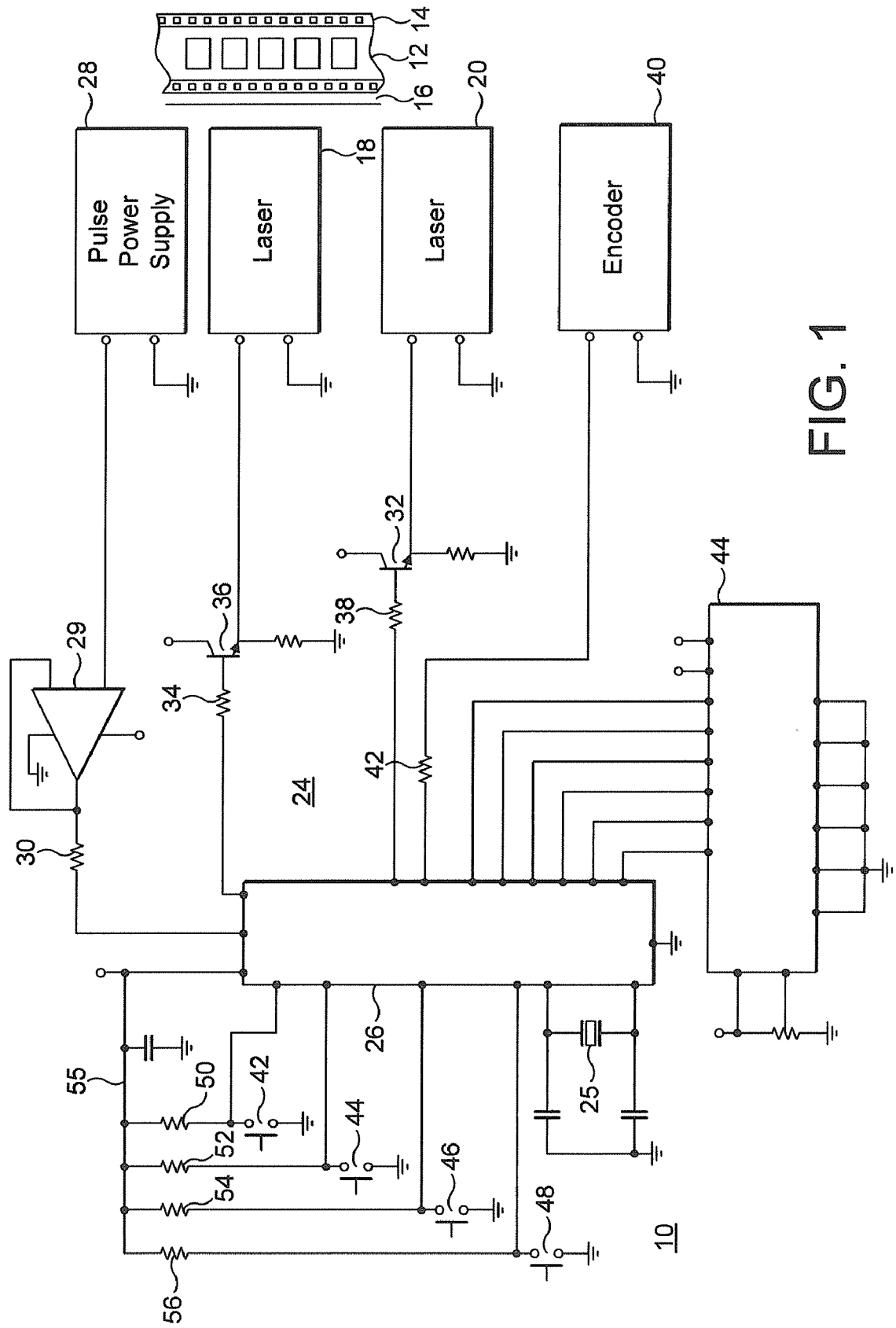
FIG. 1 depicts a block schematic diagram of a system for watermarking a motion picture release print in accordance with the present principles.

FIG. 1 describes a system 10, in accordance with a first aspect of the present principles for providing a motion picture release print 12 with a watermark specific to that print. Such a watermarking facilitates unique identification of the release print in order to track the source of illegally made copies made from that print. The watermarking technique of the present principles remains effective whether such copies exist on motion picture film or videotape, digital versatile disk (DVD) or in a computer memory.

As described in greater detail below, the system 10 operates to watermark the release print 12 by providing a tone of a particular frequency on at least one soundtrack at one or more known locations unique to that release print such that an illegal copy made from that release print will also have that same frequency tone at the corresponding location(s). Thus, the presence of such a watermark facilitates identifying the source of illegally copies made from a specific release print.

Figure 3:
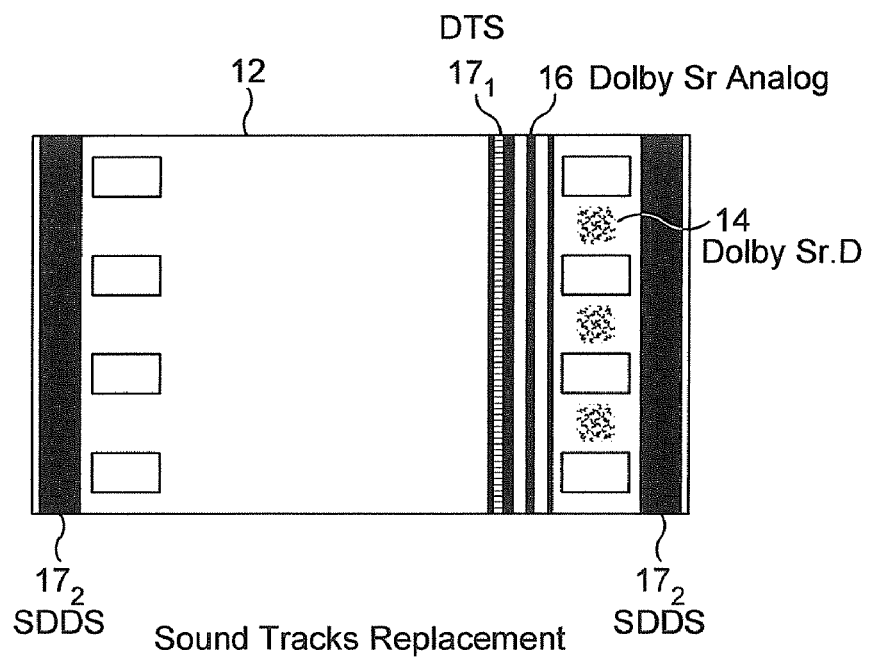
FIG. 3 depicts a portion of a motion picture film showing the placement of the sound tracks.

As best shown in FIG. 3, the release print 12 has at least two soundtracks 14 and 16. The soundtrack 14 typically comprises a Dolby® digital soundtrack, whereas track 16 comprises an analog soundtrack. In practice, the release print could contain other digitally formatted tracts, such as a Digital Theater Sound® (DTS) $17_1$ track, and a SONY® SDDS soundtrack $17_2$. As discussed in greater detail hereinafter, the system 10 of FIG. 1 serves to place a tone of particular frequency at one or more known locations on the analog track 16 such that the tone has a minimal impact on the existing audio present on that soundtrack at that location. Moreover, the system 10 also serves to render unreadable a portion of the first soundtrack 14 for the same period and at the corresponding location as the particular frequency tone on the second soundtrack 16.

Conventional projection systems (not shown), upon encountering an unreadable portion of the first soundtrack 14, will automatically switch to the second soundtrack 16. Thus, if the first sound track 14 appears unreadable at the same location as the particular frequency tone on the second sound track, a conventional projection system will switch from the first soundtrack to the second soundtrack 16 and reproduce the particular frequency tone. Typically, most conventional projections utilize the first soundtrack 14, or another digitally formatted soundtrack as the default soundtrack. Thus, rendering the first soundtrack 14 unreadable becomes necessary to effect switching to the second (i.e., analog) soundtrack to produce the particular frequency tone.

Figure 4:
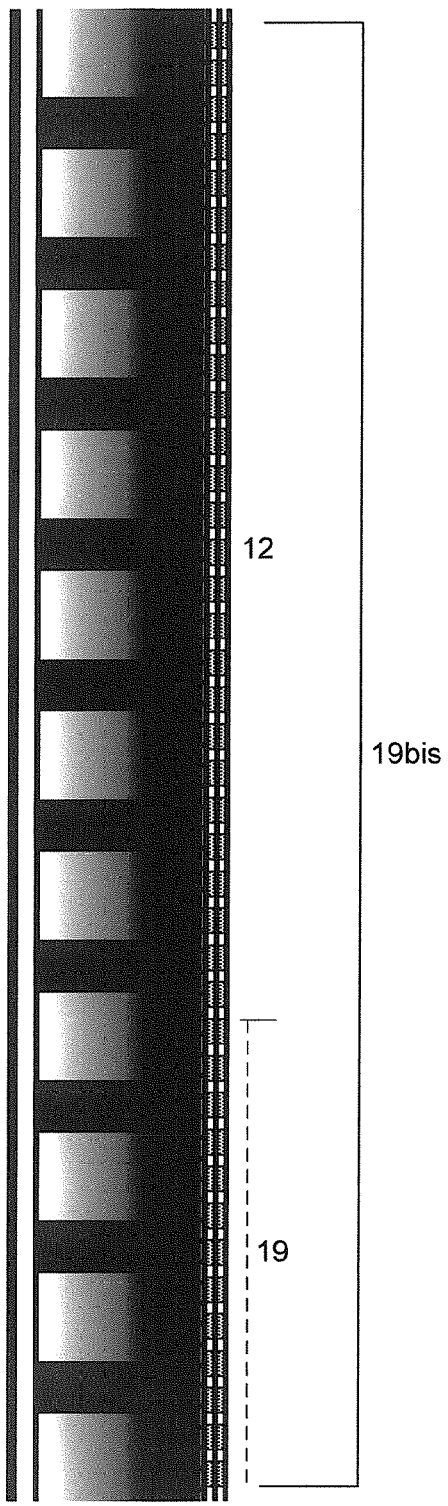
FIG. 4 shows a portion of motion picture film watermarked in accordance with the present principles.

To render the Dolby SRD soundtrack 14 unreadable, and to print the particular frequency tone on the analog Dolby SR soundtracks, the system 10 includes lasers 18 and 20, respectively. Laser 20 serves to expose several (e.g., 2-5) frames of the second soundtrack 16 under the control of a controller 24 which pulses the laser 18 via a pulse power supply 28. In this way, the laser 20 will impart the particular frequency tone on the second soundtrack 16 of the release print 12. Typically, the tone has a frequency tone of 192 Hz (@24 fps), although other frequencies are possible. Indeed, different frequency tones could appear at different locations on a particular release print 12. The use of different frequency tones affords the ability to add another distinguishing characteristic in the watermarking of each individual release print. FIG. 4 shows the release print 12 having a section 19 of the sound track 14 (SR) with the particular frequency pattern in the manner described below and the track 16 rendered unreadable 19 bis.

Each release print 12 typically has at least one tone of a particular frequency at a location unique to that print. Typically, the release print 12 will have particular frequency tones at a plurality of locations that form a pattern unique to that print. In practice, we have fond that providing at least one tone at four different locations affords a reliable watermark.

The laser 18, operating under the control of the controller 24, serves to expose, and thereby render unreadable that portion of the first soundtrack Dolby SRD 14 corresponding to the audio portion (not physically, since the Srd audio leads in advance by 6 frames) of the second soundtrack analog Dolby SR 16 printed by the laser 20 to generate the particular frequency tone. As discussed above, encountering an unreadable portion of the first soundtrack 14 (typically, the Dolby® SRD soundtrack) during projection of the release print 12 typically triggers a switch to the second (analog) Dolby Sr track 16. Thus, when the presence of the particular frequency tone on the second soundtrack 16 at the same location corresponding to the unreadable portion of the first soundtrack 14 will lead to generation of the particular frequency tone. The system 10 could include one or more additional lasers (not shown), each for render unreadable corresponding portions of one of the other digitally formatted soundtracks $17_1$ and $17_2$, such as the DTS® soundtrack and SONY® soundtracks, respectively, to make sure that switching occurs to the analog Dolby SR sound track 16 at the location of the particular frequency tone.

The lasers 18 and 20 constitute a preferred means for exposing the soundtracks 14 and 16 in the manner described. However, other mechanisms could serve to render the first soundtrack unreadable, and could print the particular frequency tone on the second soundtrack.

Each release print has a unique positioning of tones, thus allowing for identification of the release print from which an illegal media has been recorded. To that end, each release print watermarked in accordance with present principles by having unique positioning of tones typically will have an identifier, such as a serial number assigned to it. A central record, such as database 108, will store the serial number of each print and the relationship between the location(s) on that print of the particular frequency tone(s) and the serial number.

The controller 24 includes a processor 26 that can take the form of a microprocessor, microcomputer or microcontroller, typically powered by a power supply (not shown). In the illustrative embodiment, the processor 26 takes the form of a Model PIC 16F684 CMOS microcontroller manufactured by Microchip Technology, Inc., Chandler Ariz., USA, having a crystal 27 to maintain its operating frequency. The processor 26 receives the output of the pulse power supply 28 through an operating amplifier 29 coupled in series with a resistor 30. The processor 26 drives each of a pair of switching transistors 36 and 32 through resistors 34 and 38, respectively, to control the lasers 18 and 20, respectively. In particular, the processor 26 controls the transistor 32 to drive the laser 20 with the voltage of the pulse power supply 28 to print the particular frequency tone on the second soundtrack 16.

The system 10 also includes an encoder 40 that measures the movement of a motor-driven sprocket arrangement (not shown) that displaces the release print film past the lasers 18 and 20. The encoder 40 provides an output signal indicative of the displacement of the release print 12, as measured in terms of frames, to the processor 26 through a resistor 42. A LCD display 44 coupled to the processor 26 enables the processor to display the frame number of the release print 12 as well as other operating information.

An operator controls the processor 26 by through a set of single-pole, single-throw switches 42-48. Each of switches 42-44 lies between one of a first set of ports on the processor 26 and a first terminal of each of pull-up resistors 50, 52, and 54, respectively, each having their second terminal coupled to a voltage bus 55, typically at 5 Volts DC. Switch 48 serves to selectively couple another port on the processor 26 to ground, which port is coupled through a pull-up resistor 56 to the voltage bus 55. Thus, by actuating the appropriate one of the switches 42-48, the operator can select the number of frames (e.g., 2-5) of the second soundtrack 16 to be exposed through the lasers 18 and 20 at the appropriate frames on the release print 12, as displayed on the LCD display 44, to render unreadable the first soundtrack 14 and to place the particular frequency tone on the second soundtrack 16. The switches 42-48 also allow an operator to select a setup (time delay) related to mechanical configuration of the motor-driven sprocket arrangement (not shown) in the printer machine.

The watermarking of the release print 12 by providing the particular frequency tone on the second soundtrack 16 theoretically could occur anywhere on the release print, so long as the location(s) remains unique to that print. However, as a practical matter, the particular frequency tone should appear on the second soundtrack 16 only at the location(s) where the tone would have a minimal impact on the audio on the sound track (through scenes selection). Otherwise, the presence of the tone could detract from the viewing of the release print 12.

Figure 2:
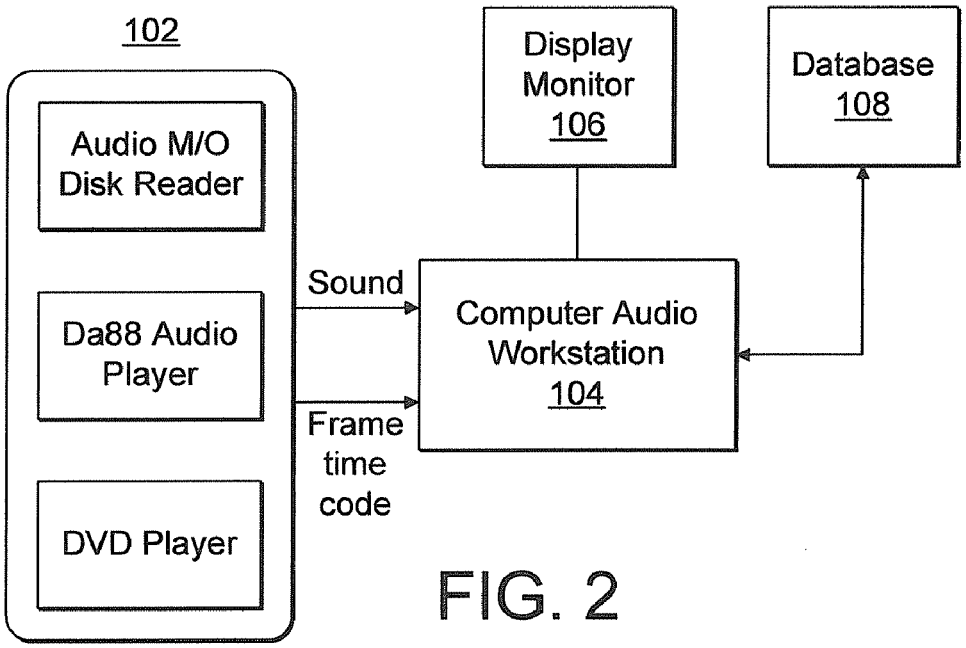
FIG. 2 depicts a block diagram of a system for detecting the presence of the watermark on a motion picture release print made by the system of FIG. 1.

FIG. 2 depicts an exemplary system 100 to determine the minimal impact areas on the second soundtrack 16 of FIG. 1 suitable for imprinting with the particular frequency tone for watermarking in accordance with the present principles. The system 100 includes audio readers 102 for M/O disk, tape DA 88, Dvd for playback of the audio mix from which will be created the negative soundtrack.

A computer 104 acquires both the soundtrack audio from the reader 102 as well time code information identifying each frame as it is read. An audio technician listening the audio soundtrack will choose the positioning where placement of the particular frequency tone will have a minimal impact and thus will not interfere with normal screening of the release print. The audio operator could also perform a spectral and level analysis on the soundtrack audio to determine whether adding the particular frequency tone to the existing audio would create a spectral disturbance outside of an acceptable threshold. The computer 102 stores the frame information in a database that identifies those locations on the soundtrack capable of accepting the particular frequency tone with minimal impact to the audio on the soundtrack.

A display 106 linked to the computer 102 serves to display information generated by the computer associated with the processing of the soundtrack audio. Thus, the display 106 can display the spectral analysis of the audio on the sound track, as well as provide a running presentation of the frame information.

The audio operator through computer 104 can also examine and listening an audio-visual work, such as a film, videotape, DVD, or streaming media file stored in computer-readable form, to determine whether it originated from a release print watermarked in the manner described above, and if so from which print. A possibly pirated media with an audio recorded from a watermarked release print, will contain the particular frequency tone. The audio of possibly pirated media is acquired in the computer 104 and the audio technician, listening the audio will try to identify the particular frequency tone. A spectral analysis of the audio from the film would be useful to detect the presence of the particular frequency tone present, and the frame(s) where the tone occurs. If the tone occurs in the frames corresponding to those of a particular release print 12 (as determined from information stored in the database 108), the computer 104 will provide an indication on the display 104 of the identity of the individual release print that served as the master for the pirated film.

The foregoing describes a technique for watermarking a motion picture release print and for detecting the presence of that watermark on a copy of the print, regardless of the format of the copy.

The invention claimed is:

1. A method for watermarking a motion picture release print, comprising the steps of:
   providing on a first soundtrack on the release print at least one tone of a particular frequency on at least one location unique to the release print;
   assigning to the release print a unique identifier corresponding to the at least one location of on the first soundtrack of the particular frequency tone unique to the release print
   providing on a second soundtrack at least one tone of a particular frequency at the at least one location unique to the release print; and
   rendering unreadable the first soundtrack at each location corresponding to each location at which the particular frequency tone is provided on the second soundtrack.

2. A method for watermarking a motion picture release print containing a first and second soundtracks, comprising the steps of:
   providing on the second soundtrack at least one tone of a particular frequency on a plurality of locations unique to the release print;
   rendering unreadable the first soundtrack at each location corresponding to each location at which the particular frequency tone is provided on the second sound track; and
   assigning to the release print a unique identifier associated with which are the locations of the at least one particular frequency tone.

3. The method according to claim 2 wherein the providing step further comprises the steps of
   determining for the second sound track at plurality locations at which providing the particular frequency tone will have minimal impact on existing sound track audio; and
   providing the particular frequency tone on selected ones of the plurality of locations on the second soundtrack having minimal impact.

4. The method according to claim 2 further comprises the step of determining for the first sound track at least four locations at which the particular frequency tone will have minimal impact on existing sound track audio.

5. The method according to claim 4 further comprising the step of providing the particular frequency tone on at least four locations having minimal impact.

6. The method according to claim 4 wherein the providing step further comprises the step of providing tones of different frequency at selected locations havening minimal impact.

7. An apparatus for watermarking a motion picture release print, comprising:
   means for providing on a first soundtrack on the release print at least one tone of a particular frequency on at least one location unique to the release print;
   storage means for retaining for the release print a unique identifier associated with the at least one unique location on the first sound track of the at least one particular frequency tone;
   means for providing on a second soundtrack at least one tone of a particular frequency on the at least one unique location unique to the release print;
   means for rendering unreadable the first soundtrack at each location corresponding to each location at which the particular frequency tone is provided on the first soundtrack.

\* \* \* \* \*